US012586954B2

(12) United States Patent
Yeh et al.

(10) Patent No.: US 12,586,954 B2
(45) Date of Patent: Mar. 24, 2026

(54) AUTO DETACHING CONNECTOR FOR ELECTRONIC DEVICES

(71) Applicant: GOOGLE LLC, Mountain View, CA (US)

(72) Inventors: Chia-Hang Yeh, Campbell, CA (US); Hsing-Sheng Lin, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 202 days.

(21) Appl. No.: 18/262,760

(22) PCT Filed: Feb. 3, 2021

(86) PCT No.: PCT/US2021/070118
§ 371 (c)(1),
(2) Date: Jul. 25, 2023

(87) PCT Pub. No.: WO2022/169524
PCT Pub. Date: Aug. 11, 2022

(65) Prior Publication Data
US 2024/0347970 A1 Oct. 17, 2024

(51) Int. Cl.
*H01R 13/633* (2006.01)
*H01M 50/202* (2021.01)
(Continued)

(52) U.S. Cl.
CPC ........ *H01R 13/633* (2013.01); *H01M 50/202* (2021.01); *H01M 50/24* (2021.01);
(Continued)

(58) Field of Classification Search
CPC .. H01M 13/633; H01M 50/24; H01M 50/519; H01M 50/202; H01M 50/574;
(Continued)

(56) References Cited

U.S. PATENT DOCUMENTS 10,164,226 B2 * 12/2018 Sumner ................ H01M 50/50
10,593,494 B2 3/2020 Furuuchi et al.
(Continued)

FOREIGN PATENT DOCUMENTS

CN 103227871 A 7/2013
CN 108282556 A 7/2018
(Continued)

OTHER PUBLICATIONS

International Search Report and Written Opinion for PCT Application No. PCT/US2021/070118, mailed on Oct. 28, 2021, 13 pages.

*Primary Examiner* — Gary F Paumen
(74) *Attorney, Agent, or Firm* — Brake Hughes Bellermann LLP

(57) ABSTRACT

A connector includes a housing and a multi-layer peripheral structure disposed on the housing. The multi-layer peripheral structure is configured to enclose one or more pins and to expand in response to exposure to a liquid for disconnecting the connector from an electronic component without user intervention. The multi-layer peripheral structure may include an outer layer that may include a permeable material, a middle layer disposed within the outer layer, where the middle layer may include a material that expands when wet, and an inner layer disposed within the middle layer.

19 Claims, 14 Drawing Sheets

(51) Int. Cl.

| | |
|---|---|
| *H01M 50/24* | (2021.01) |
| *H01M 50/284* | (2021.01) |
| *H01M 50/519* | (2021.01) |
| *H01M 50/574* | (2021.01) |

(52) U.S. Cl.
CPC ....... *H01M 50/284* (2021.01); *H01M 50/519* (2021.01); *H01M 50/574* (2021.01); *H01M 2200/00* (2013.01)

(58) Field of Classification Search
CPC . H01M 50/284; H01M 2200/00; H01M 50/74
USPC ......................................................... 439/55
See application file for complete search history.

(56) References Cited

U.S. PATENT DOCUMENTS

| | | | |
|---|---|---|---|
| 2010/0226509 A1 | 9/2010 | Filson et al. | |
| 2011/0014515 A1 | 1/2011 | Boda et al. | |
| 2015/0004457 A1 | 1/2015 | Visco et al. | |
| 2015/0285730 A1* | 10/2015 | Powell ................... | G01N 33/00 73/73 |

FOREIGN PATENT DOCUMENTS

| | | |
|---|---|---|
| CN | 211062765 U | 7/2020 |
| GB | 1359736 A | 7/1974 |

* cited by examiner y-Direction x-Direction

1300

Absorb water through a multi-layer peripheral structure on a connector that is connected to a component — 1302

Responsive to absorbing the water, detach the connector from the component without user intervention — 1304

AUTO DETACHING CONNECTOR FOR ELECTRONIC DEVICES

CROSS REFERENCE TO RELATED APPLICATION

This application is a 35 U.S.C. § 371 National Phase Entry Application from PCT/US2021/070118, filed Feb. 3, 2021, designating the U.S., the disclosure of which is incorporated herein by reference in its entirety.

TECHNICAL FIELD

This description relates to an automatically detaching connector for electronic devices.

BACKGROUND

Today, consumers use consumer electronics devices, e.g. mobile devices, in all kinds of environments. Very often, an electronic device may be soaked in water by accident. For instance, the electronic device may get wet in the rain or be dropped in water, etc. When that happens, it may be prudent for the user to disconnect the battery to avoid further damage to the electronic device or for safety reasons. However, a user is not likely to be able to take any action to immediately disconnect the battery from the other electronic components in the electronic device. For one reason most devices today have a non-removable battery, that users cannot easily disconnect without tearing down the device. As time goes by, a wet battery connector may start electrolysis that might create a potential safety hazard or cause damage to the electronic device. In some cases, one solution may be to waterproof the electronic device; however, waterproofing of the electronic device may needlessly increase the cost and complexity of the electronic device.

SUMMARY

This document describes a connector (e.g., a battery connector) that can detach itself from a printed circuit board (PCB) or other electronic component when the connector encounters moisture.

According to one general aspect, a connector includes a housing and a multi-layer peripheral structure disposed on the housing. The multi-layer peripheral structure is configured to enclose one or more pins and to expand in response to exposure to a liquid for disconnecting the connector from an electronic component without user intervention.

In another general aspect, an electronic device includes a printed circuit board (PCB) having one or more components, a battery, and a connector to connect the battery to the PCB. The connector includes a housing and a multi-layer peripheral structure disposed on the housing. The multi-layer peripheral structure is configured to enclose one or more pins and to expand in response to exposure to a liquid for disconnecting the connector from the PCB without user intervention.

In another general aspect, a method for auto-detaching a connector from a component includes the connector having a multi-layer peripheral structure configured to enclose one or more pins and to expand in response to exposure to a liquid for disconnecting the connector from an electronic component and the method includes absorbing water through the multi-layer peripheral structure of the connector that is connected to a component and, responsive to absorbing the water, detaching the connector from the component without user intervention by expansion of the multi-layer peripheral structure.

The details of one or more implementations are set forth in the accompanying drawings and the description below. Other features will be apparent from the description and drawings, and from the claims.

DETAILED DESCRIPTION

This document describes a connector (e.g., a battery connector) that can detach itself from a printed circuit board (PCB) or other electronic component when the connector encounters moisture. The connector may be referred to as an auto detaching connector or automatically detaching connector because in response to encountering moisture, the connector detaches itself from whatever device or component that the connector is attached to without user intervention. In this manner, the connector solves the technical problems described above when water is introduced to electronic devices to prevent or at least mitigate damage to electronic components by automatically detaching a connector. For example, when the connector connects a power source, such as a battery, to a PCB or other electronic component, the connector solves the technical problems of damage to components or other safety hazards that may occur when the connector gets wet by detaching the connector from the power source without user intervention.

In some implementations, the connector uses a multi-layer peripheral wall that includes an outer layer, a middle layer, and an inner layer to achieve the technical solution of auto detaching from the component that it is connected to when the connector encounters moisture. The outer layer may include a structure and/or be made of a material(s) that allows moisture to enter the middle layer. The middle layer may be made of a structure and/or be made of a material(s) that expands in size when the middle layer gets wet (e.g., when the middle layer encounters moisture). The inner layer may be made of a structure and/or be made of material(s) that slows the water from reaching the inner portion of the connector where the pins connect the connector to corresponding pins on a component. The outer layer and the inner layer may be structured to hold the middle layer in place and to constrict or otherwise prevent the horizontal expansion of the middle layer. In this manner, when the middle layer absorbs moisture, the middle layer expands in the vertical direction and the middle layer pushes the connector to detach from the component when the moisture content of the middle layer reaches a certain level, the vertical direction being essentially parallel to in an extension plane of the middle layer and the horizontal direction being essentially perpendicular to the extension plane of the middle layer. Additional details are described below in conjunction with the figures.

Figure 1:
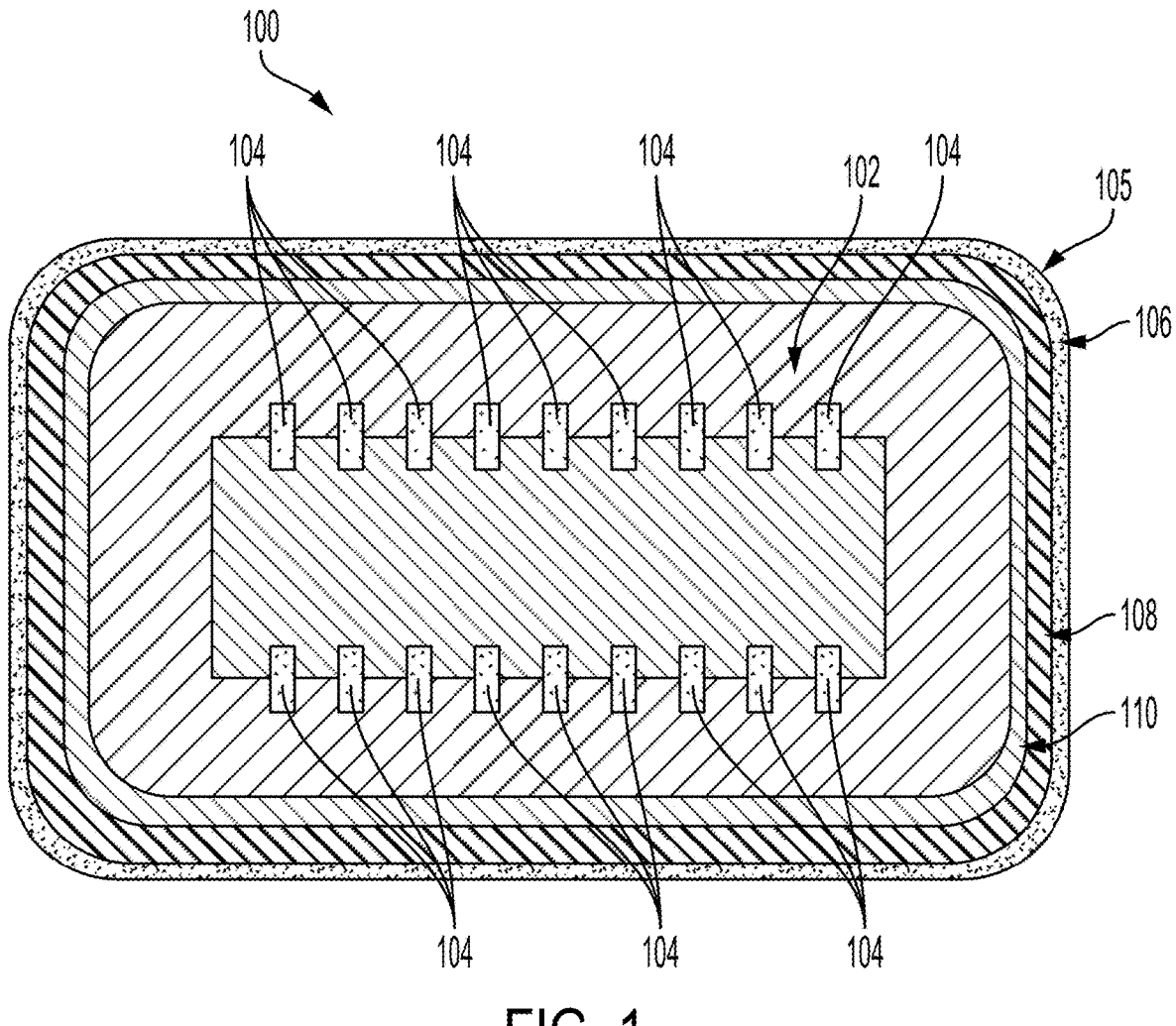
FIG. 1 is a sketch of a top view of an example connector.

FIG. 1 is an example sketch of a top view of a connector 100. The connector 100 is an electrical connector that connects one component in an electronic device to one or more other components in the electronic device. For example, the connector 100 may connect a power source (e.g., a battery) in an electronic device to one or more other components in the electronic device. In an example when the power source is a battery (e.g., a lithium ion or other type of battery), the connector 100 may be referred to as a battery connector. The connector 100 may be configured to connect to a printed circuit board (PCB). In some implementations, the connector 100 may be a female connector and in some implementations, the connector 100 may be a male connector. The connector 100 may be used in any type of electronic device including, without limitation, a phone, a smart watch, smart glasses, a smart ring, other wearable electronic devices, a computing device, a laptop, a tablet, as well as other electronic devices.

In some implementations, the connector 100 includes a housing 102 that provides a structure for and houses one or more pins 104. While the connector 100 illustrated in FIG. 1 includes 18 pins, it is understood that the number of illustrated pins is provided for example only and that the connector may include other numbers of pins (e.g., 2, 4, 6, 8, 10, 12, etc.). The connector 100 includes multi-layer peripheral structure (e.g., a multi-layer peripheral wall) 105 that is connected to the housing 102. The multi-layer peripheral structure 105 may be integrated with the housing 102. That is, the multi-layer peripheral structure 105 may be physically connected to and integrated with the housing 102 as one integrated piece.

The multi-layer peripheral structure 105 provides the structure for the connector 100 to automatically detach the connector 100 from the component it is connected to when the connector 100 encounters moisture. In some implementations, the multi-layer peripheral structure 105 includes an outer layer 106, a middle layer 108, and an inner layer 110. While not illustrated in this example, the outer layer 106, the middle layer 108, and the inner layer 110 may each include a single layer or may each include more than one layer.

The outer layer 106 includes a structure to allow moisture to penetrate the outer layer 106 and to enter the middle layer 108. For example, the outer layer 106 may include a permeable material that is configured to allow moisture to penetrate the outer layer. In some implementations, the permeability of the outer layer 106 allows water to enter the middle layer 108 without causing the outer layer 106 to expand appreciably in any particular direction. The outer layer 106 may include different forms and/or different materials including mesh or other types of permeable materials.

The middle layer 108 is concentric within the outer layer 106. The middle layer 108 may include a structure and/or material that expands when exposed to water. In this manner, when the connector 100 is exposed to water, the middle layer 108 expands as the water permeates through the outer layer 106 and penetrates the middle layer 108. The expansion of the middle layer 108 in the Y-direction (or vertical direction) causes the connector 100 to detach from the component it is connected to without user or other intervention. In some implementations, the middle layer 108 includes a material made of a superabsorbent polymer. In some implementations, the middle layer 108 includes a material made of sodium polyacrylate, also known as waterlock, which is a type of a superabsorbent polymer. In some implementations, the middle layer 108 includes a material made of HydroSpan, which is a flexible urethane casting resin that increases in size when exposed to water. In some implementations, the middle layer 108 may be a combination of different types of absorbent materials that expand when exposed to water.

The inner layer 110 is concentric within the middle layer 108, which, as described above, is concentric within the outer layer 106. The inner layer 110 may be structured and/or made of a solid, non-permeable material. Unlike the outer layer 106, the inner layer 110 is configured to prevent or at least delay moisture from reaching the pins 104. The outer layer 106 and the inner layer 110 hold the middle layer 108 in place and provide support to limit the X-direction (or horizontal direction) of expansion of the middle layer 108. In this manner, the middle layer 108 is configured to expand primarily in the Y (or vertical) direction to push the connector 100 to detach from the receptacle that the connector 100 is connected to, the vertical direction being essentially parallel to in an extension plane of the middle layer and the horizontal direction being essentially perpendicular to the extension plane of the middle layer. In some implementations, the multi-layer peripheral structure 105 may be referred to as a sandwich structure because the middle layer 108 is sandwiched between the outer layer 106 and the inner layer 110.

In use, the connector 100 may be used to connect one component of an electronic device to another component of an electronic device. In some implementations, for example, the connector 100 is a battery connector that connects to a battery. While not illustrated in FIG. 1, the connector 100 may include one or more wires or cables that connect to the pins 104 and exit through a back of the housing 102. The wires and/or cables may be connected to another connector at the other end of the wires and/or cables to connect to another component so that a connection is made between the battery and the other component. In some implementations, the other component may simply be a connection to a PCB so that power is delivered from the battery through the connector 100 to the PCB for further distribution from the PCB to other components.

While in use, if the electronic device in which the connector 100 is being used gets wet, the water or moisture may contact the connector 100. As discussed above, the multi-layer peripheral structure 105 is structured to allow the water or moisture to permeate through the outer layer 106 and penetrate the middle layer 108. The multi-layer peripheral structure 105 is structured not to let the water or moisture penetrate through the inner layer 110 to the pins 104. At a minimum, the multi-layer peripheral structure 105 is structured to delay the water or moisture from penetrating through the inner layer 110 to the pins 104. When the water or moisture contacts the middle layer 108, the middle layer 108 includes material that is configured to absorb the water or moisture and to expand in a vertical direction (Y-direction) and not in a horizontal direction (X-direction). The middle layer 108 is constrained from expanding in the X-direction because it is contained by the inner layer 110 and the outer layer 106. That is, the middle layer 108 is sandwiched between the inner layer 110 and the outer layer 106. When the amount of absorption in the material of the middle layer 108 reaches a certain level, the middle layer 108 expands in the vertical direction (Y-direction) and forces itself off of the component it is connected to. For example, the connector 100 forces itself off of the battery. In this manner, the connector 100 is no longer connected to the battery and further damage to the electronic device may be prevented.

Figure 2:
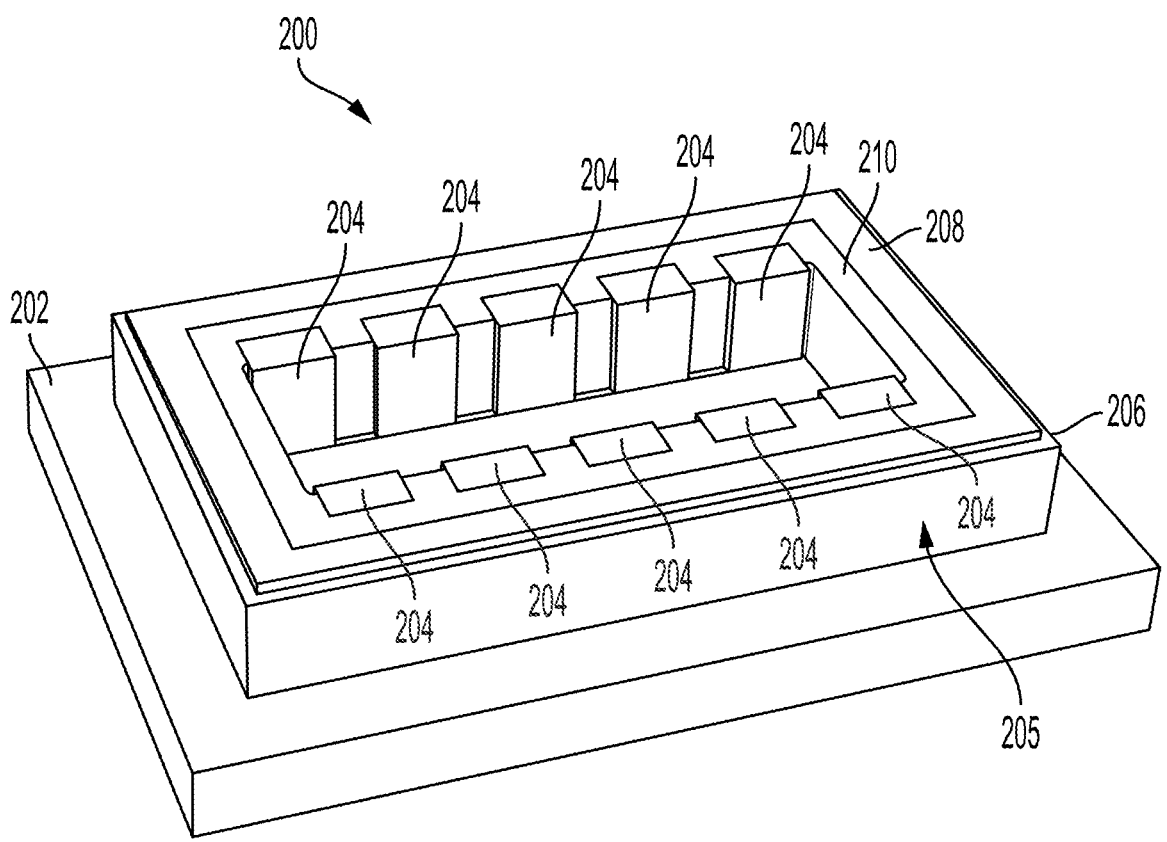
FIG. 2 is a sketch of an isometric view of an example connector.
Figure 3:
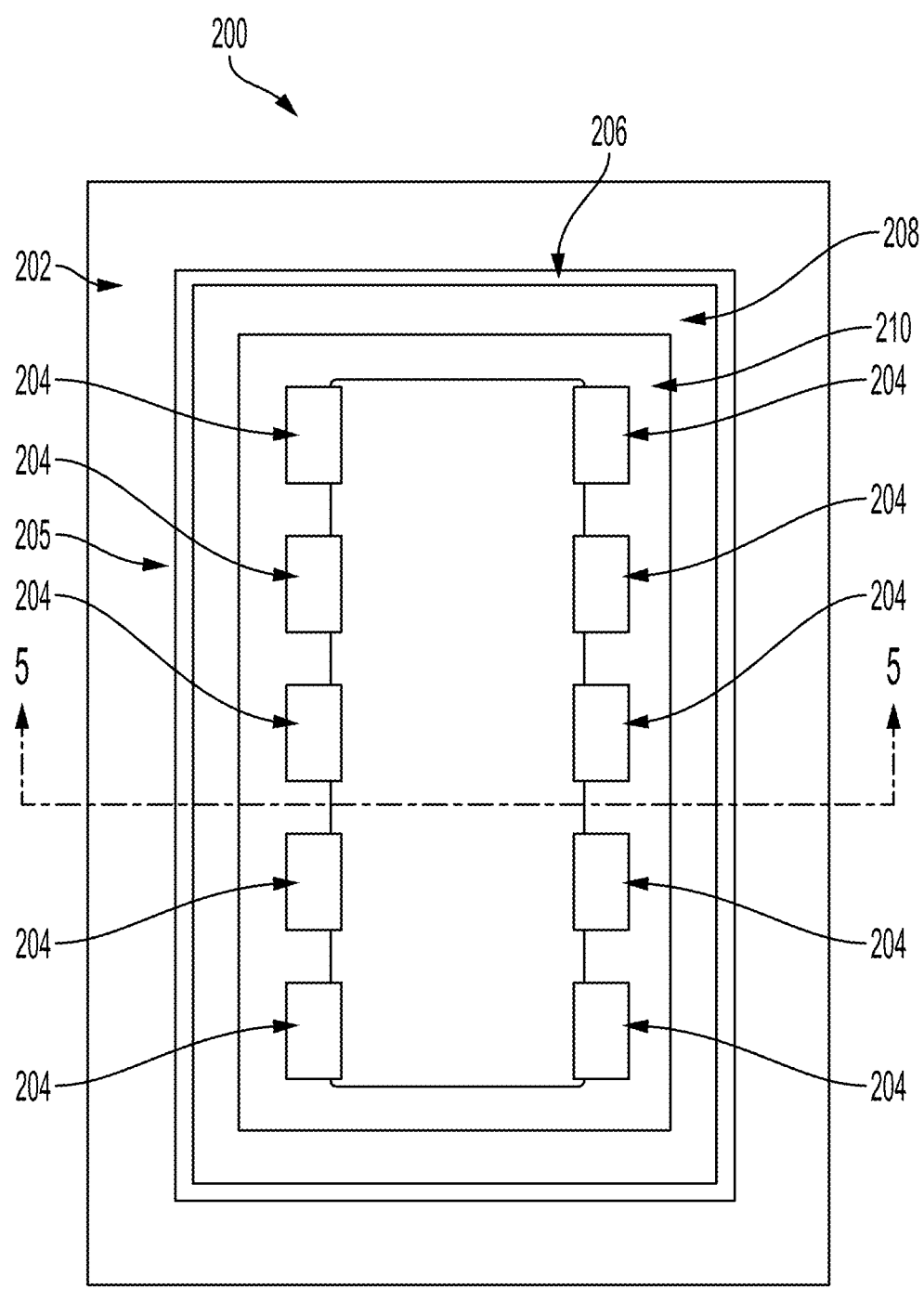
FIG. 3 is a sketch of a front view of the example connector of FIG. 2.
Figure 4:
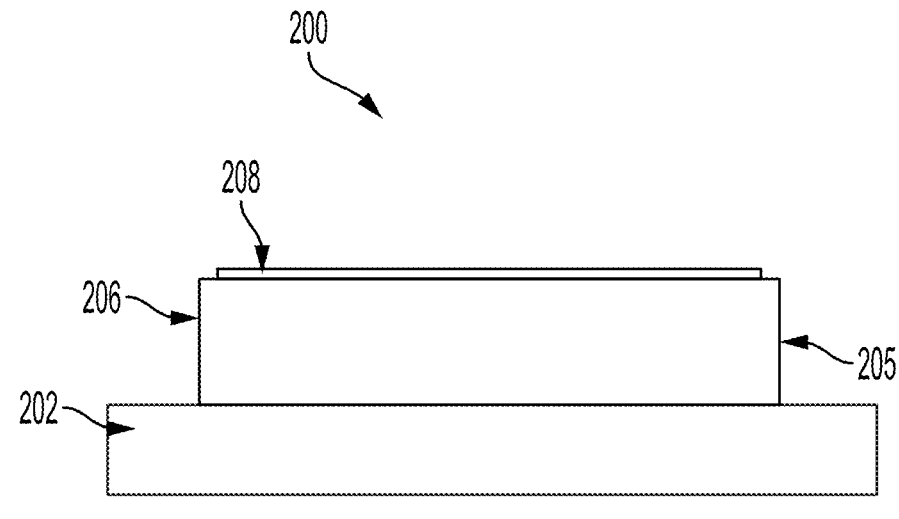
FIG. 4 is a sketch of a side view of the example connector of FIG. 2.
Figure 5:
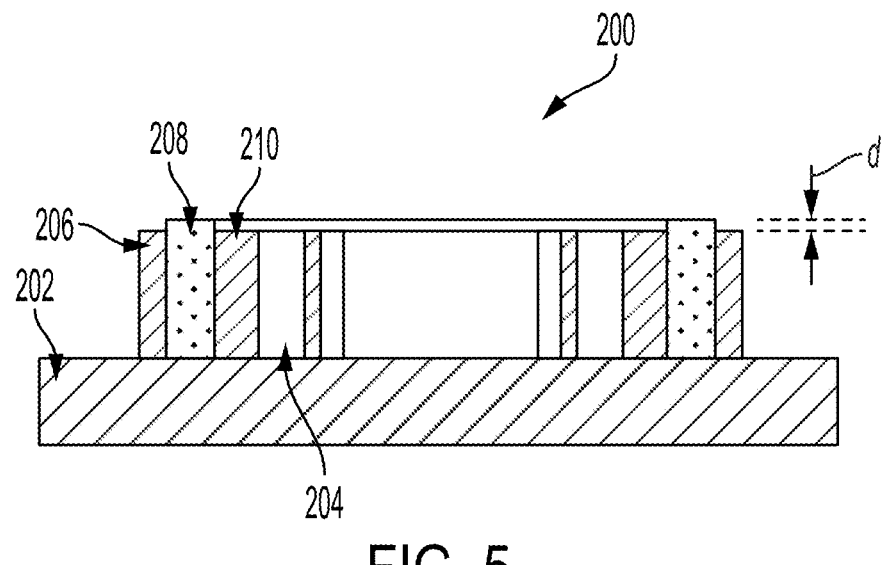
FIG. 5 is a sketch of a cross section view taken along the line 5-5 of the example connector of FIG. 3.

Referring to FIGS. 2-5, an example connector 200 is illustrated. The connector 200 is similar to the connector 100 of FIG. 1. The connector 200 may include the same features as the connector 100 of FIG. 1 and function in the same way as the connector 100 of FIG. 1. FIG. 2 is a sketch of an isometric view of the connector 200. FIG. 3 is a sketch of a front view of the connector 200. FIG. 4 is a sketch of a side view of the connector 200 and FIG. 5 is a sketch of a cross section view of the connector 200 taken along the line 5-5 in FIG. 3.

The connector 200 is an electrical connector that connects one component in an electronic device to one or more other components in the electronic device. For example, the connector 200 may connect a power source (e.g., a battery) in an electronic device to one or more other components in the electronic device. In an example when the power source is a battery (e.g., a lithium ion or other type of battery), the connector 200 may be referred to as a battery connector. The connector 200 may be configured to connect to a printed circuit board (PCB). In some implementations, the connector 200 may be a female connector. In some implementations, the connector 200 may be configured as a male connector. The connector 200 may be used in any type of electronic device including, without limitation, a phone, a smart watch, smart glasses, a smart ring, other wearable electronic devices, a computing device, a laptop, a tablet, as well as other electronic devices.

In some implementations, the connector 200 includes a housing 202 that provides a structure for and houses one or more pins 204. While the connector 200 illustrated in FIG. 2 includes 10 pins, it is understood that the number of illustrated pins is provided for example only and that the connector may include other numbers of pins (e.g., 2, 4, 6, 8, 12, 14, 16, 18, 20, etc.). The connector 200 includes multi-layer peripheral structure (e.g., a multi-layer peripheral wall) 205 that is connected to the housing 202. The multi-layer peripheral structure 205 may be integrated with the housing 202. That is, the multi-layer peripheral structure 205 may be physically connected to and integrated with the housing 202 as one integrated piece.

The multi-layer peripheral structure 205 provides the structure for the connector 200 to automatically detach the connector 200 from the component it is connected to when the connector 200 encounters moisture. In some implementations, the multi-layer peripheral structure 205 includes an outer layer 206, a middle layer 208, and an inner layer 210. While not illustrated in this example, the outer layer 206, the middle layer 208, and the inner layer 210 may each include a single layer or may each include more than one layer. The multi-layer peripheral structure 205 includes the same features and functionality as the multi-layer peripheral structure 105 of FIG. 1. Likewise, the outer layer 206, the middle layer 208, and the inner layer 210 include the same features and functionality as the outer layer 106, the middle layer 108, and the inner layer 110 of FIG. 1, respectively.

For example, the outer layer 206 includes a structure to allow moisture to penetrate the outer layer 206 and to enter the middle layer 208. For example, the outer layer 206 may include a permeable material that is configured to allow moisture to penetrate the outer layer. In some implementations, the permeability of the outer layer 206 allows water to enter the middle layer 208 without causing the outer layer 206 to expand appreciably in any particular direction. The outer layer 206 may include different forms and/or different materials including mesh or other types of permeable materials.

The middle layer 208 is concentric within the outer layer 206. The middle layer 208 may include a structure and/or material that expands when exposed to water. In this manner, when the connector 200 is exposed to water, the middle layer 208 expands as the water permeates through the outer layer 206 and penetrates the middle layer 208. The expansion of the middle layer 208 in the Y-direction (or vertical direction) causes the connector 200 to detach from the component it is connected to without user or other intervention. In some implementations, the middle layer 208 includes a material made of a superabsorbent polymer. In some implementations, the middle layer 208 includes a material made of sodium polyacrylate, also known as waterlock, which is a type of a superabsorbent polymer. In some implementations, the middle layer 208 includes a material made of HydroSpan, which is a flexible urethane casting resin that increases in size when exposed to water. In some implementations, the middle layer 208 may be a combination of different types of absorbent materials that expand when exposed to water.

The inner layer 210 is concentric within the middle layer 208, which, as described above, is concentric within the outer layer 206. The inner layer 210 may be structured and/or made of a solid, non-permeable material. Unlike the outer layer 206, the inner layer 210 is configured to prevent or at least delay moisture from reaching the pins 204. The outer layer 206 and the inner layer 210 hold the middle layer 208 in place and provide support to limit the X-direction (or horizontal direction) of expansion of the middle layer 208. In this manner, the middle layer 208 is configured to expand primarily in the Y (or vertical) direction to push the connector 200 to detach from the receptacle that the connector 200 is connected to, the vertical direction being essentially parallel to in an extension plane of the middle layer and the horizontal direction being essentially perpendicular to the extension plane of the middle layer. In some implementations, the multi-layer peripheral structure 205 may be referred to as a sandwich structure because the middle layer 208 is sandwiched between the outer layer 206 and the inner layer 210.

As seen more clearly in FIGS. 4 and 5, the middle layer 208 may be raised slightly higher than both the outer layer 206 and the inner layer 210. That is, the middle layer 208 may extend above the outer layer 206 and the inner layer 210 by a distance d, as illustrated in FIG. 5. The extended distance of the middle layer 208 may aid the middle layer 208 in disconnecting or auto-detaching from a connected component when the middle layer absorbs water and expands.

Figure 6:
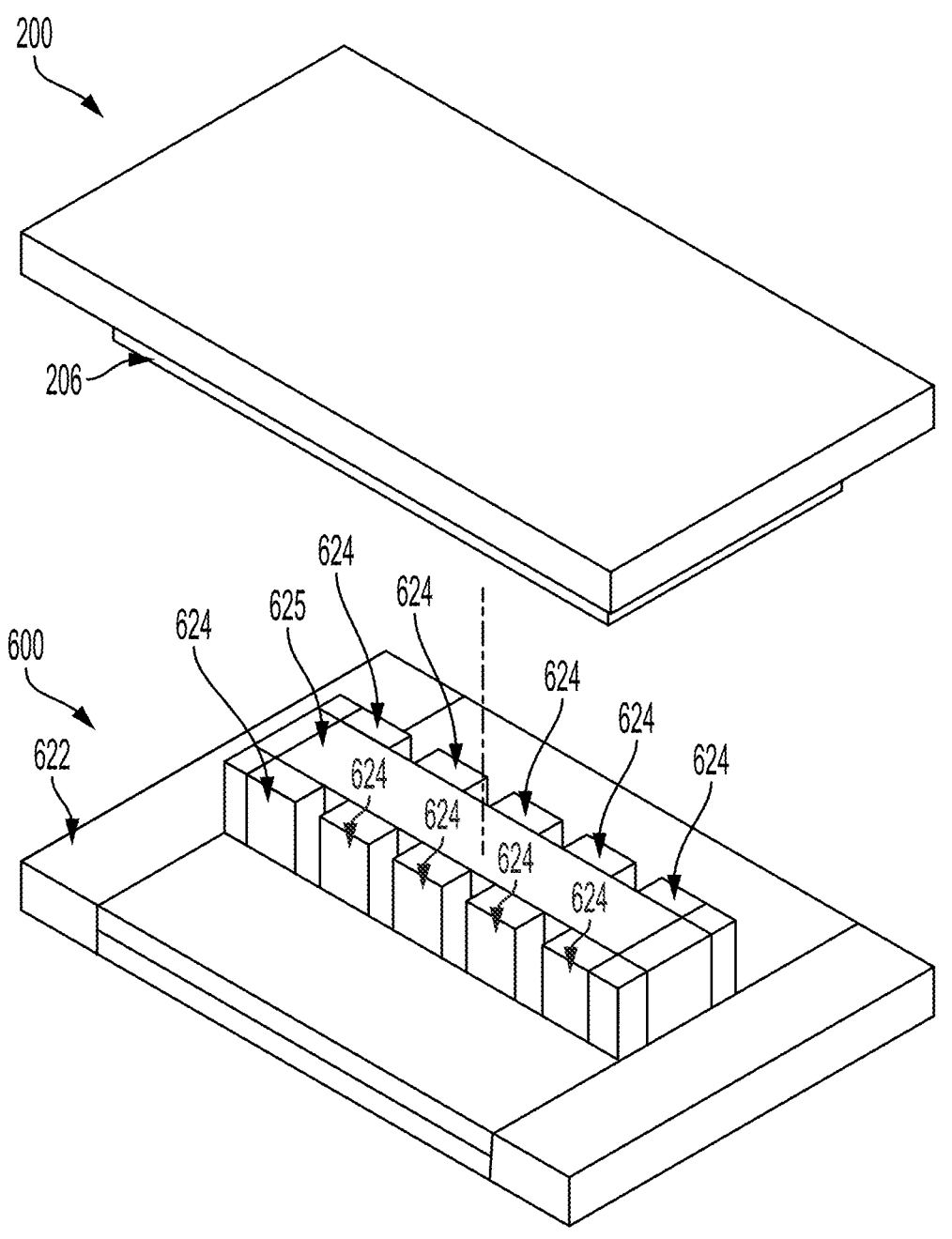
FIG. 6 is a sketch of an isometric view of the example connector of FIG. 2 and a sketch of an isometric view of an example receptacle.
Figure 7:
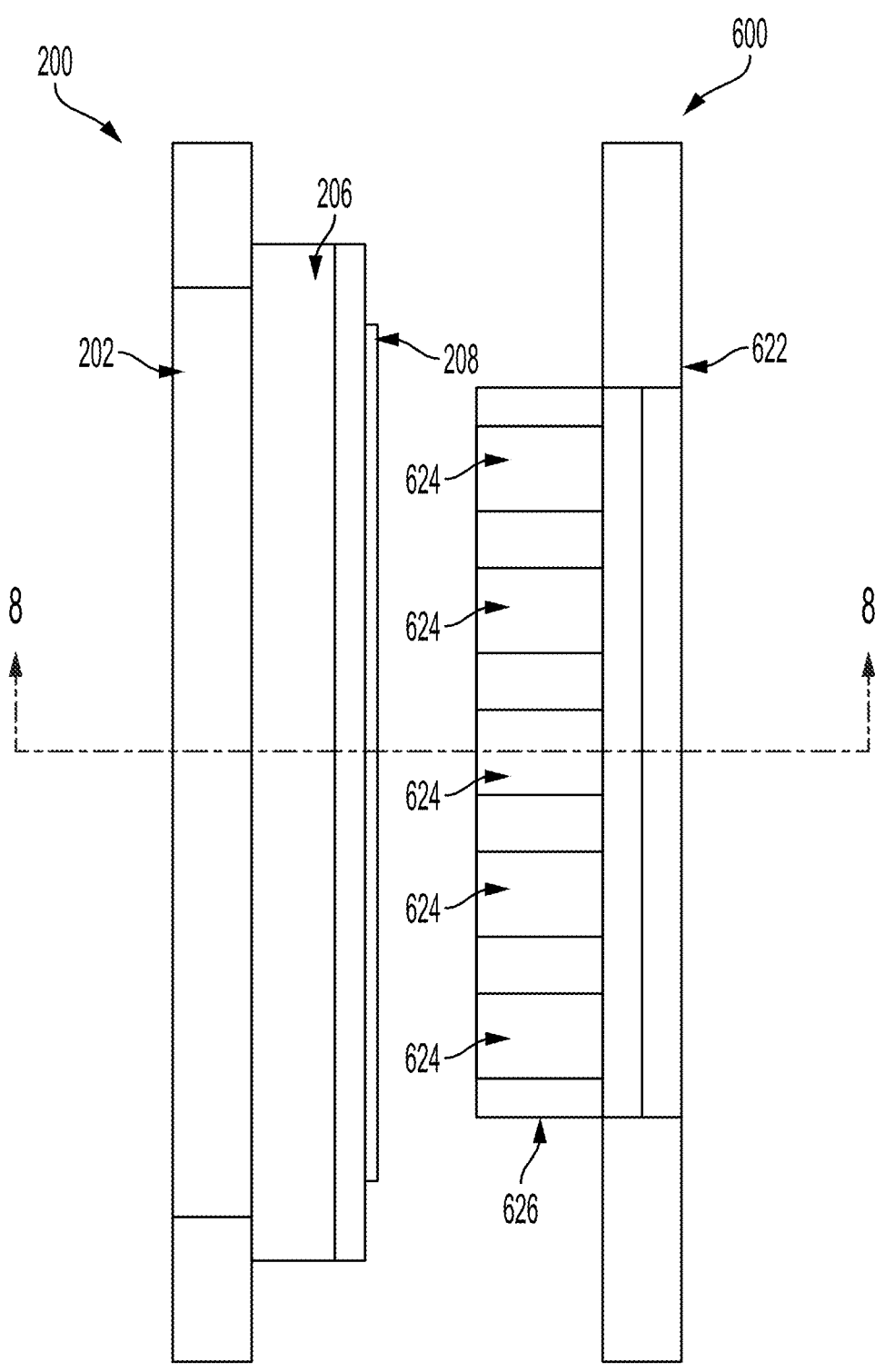
FIG. 7 is a sketch of a side view of the example connector of FIG. 6 and a sketch of the side view of the example receptacle of FIG. 6.

Referring to FIGS. 6 and 7, the connector 200 is illustrated along with an example receptacle 600. FIG. 6 is a sketch of an isometric view of the connector 200 a sketch of an isometric view of the receptacle 600. FIG. 7 is a sketch of a side view of the connector 200 a sketch of the side view of the receptacle 600. The receptacle 600 represents a component that the connector 200 may be connected to. For instance, the receptacle 600 may be a connection point on a PCB or may be a connection point to a battery component that the connector 200 is configured to mate with and connect to. The receptacle 600 includes a housing 622 that is configured to support pin structure 626 and pins 624. In this example, the receptacle 600 includes 10 pins 624 to match with the 10 pins 204 on the connector 200. As noted above with respect to the connector 200, it is understood that the number of pins 624 illustrated on the receptacle 600 is merely an example and the receptacle 600 may include other numbers of pins to match and mate with a similar number of pins on the connector 200.

Referring to FIGS. 8-11, the process of the connector 200 being connected to the receptacle 600 and then the connector 200 being auto-detached from the receptacle 600 in response to water or moisture exposure is illustrated. FIGS. 8-11 are cross-sections of the connector 200 and the receptacle 600 taken along the line 8-8 of FIG. 7. FIGS. 8-11 also include a direction key to indicate the X-direction (horizontal direction) and the Y-direction (vertical direction), as discussed earlier with respect to the operation of the connector 200 and the expansion of the middle layer 208. While not illustrated in FIGS. 8-11, the connector 200 may include one or more wires or cables that connect to the pins 204 and exit through a back of the housing 202. The wires and/or cables may be connected to another connector at the other end of the wires and/or cables to connect to another component so that a connection is made between the battery and the other component.

Figure 8:
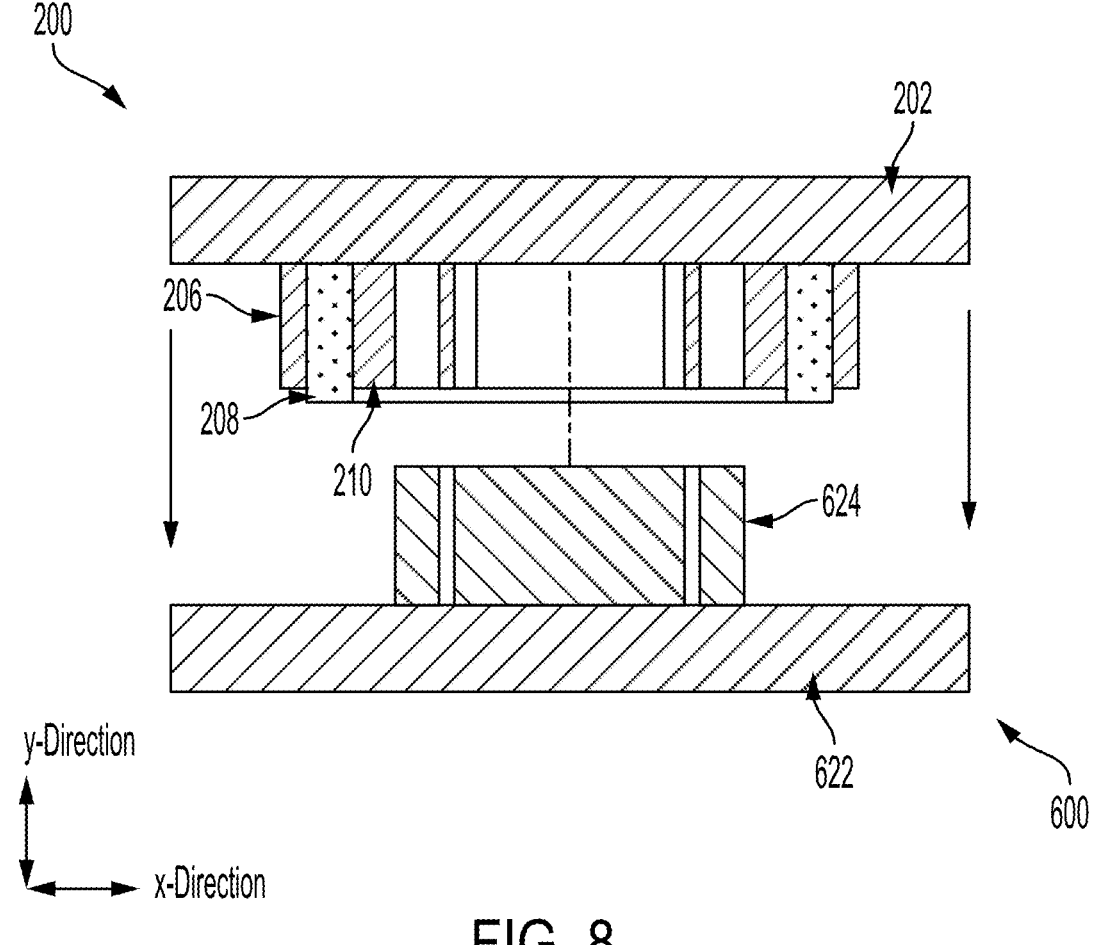
FIG. 8 is a sketch of a cross section taken along the line of 8-8 of the example connector of FIG. 7 and a sketch of a cross section taken along the line of 8-8 of the example receptacle of FIG. 7 with the connector and the receptacle apart.
Figure 9:
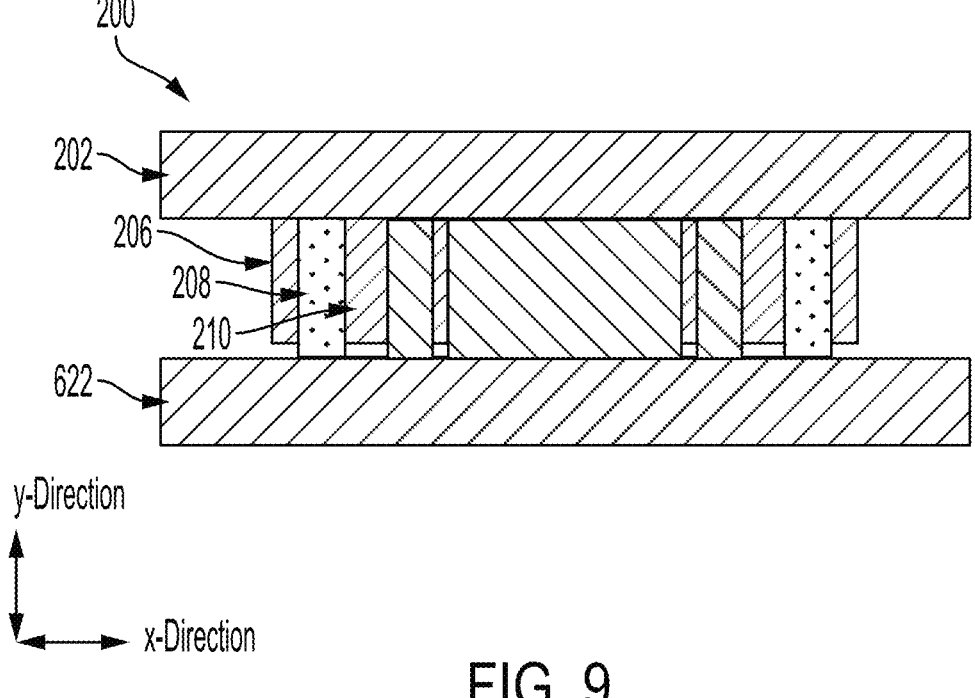
FIG. 9 is a sketch of a cross section taken along the line of B-B of the example connector of FIG. 7 and a sketch of a cross section taken along the line of C-C of the example receptacle of FIG. 7 with the connector and the receptacle assembled.
Figure 10:
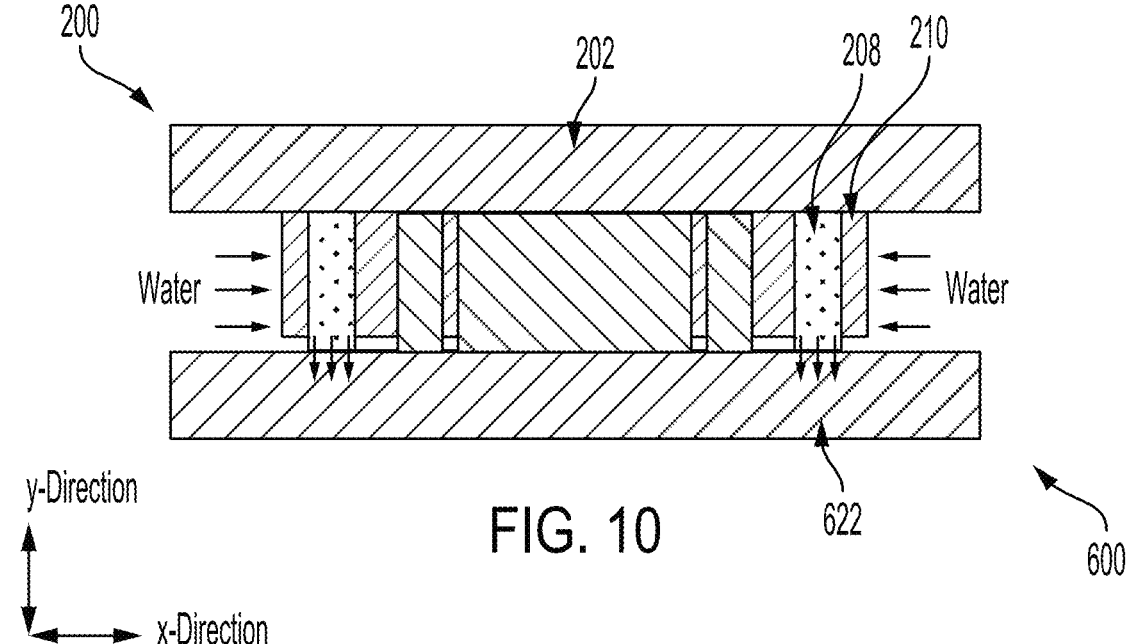
FIG. 10 is a sketch of a cross section taken along the line of B-B of the example connector of FIG. 7 and a sketch of a cross section taken along the line of C-C of the example receptacle of FIG. 7 with the connector and the receptacle assembled and exposed to moisture.
Figure 11:
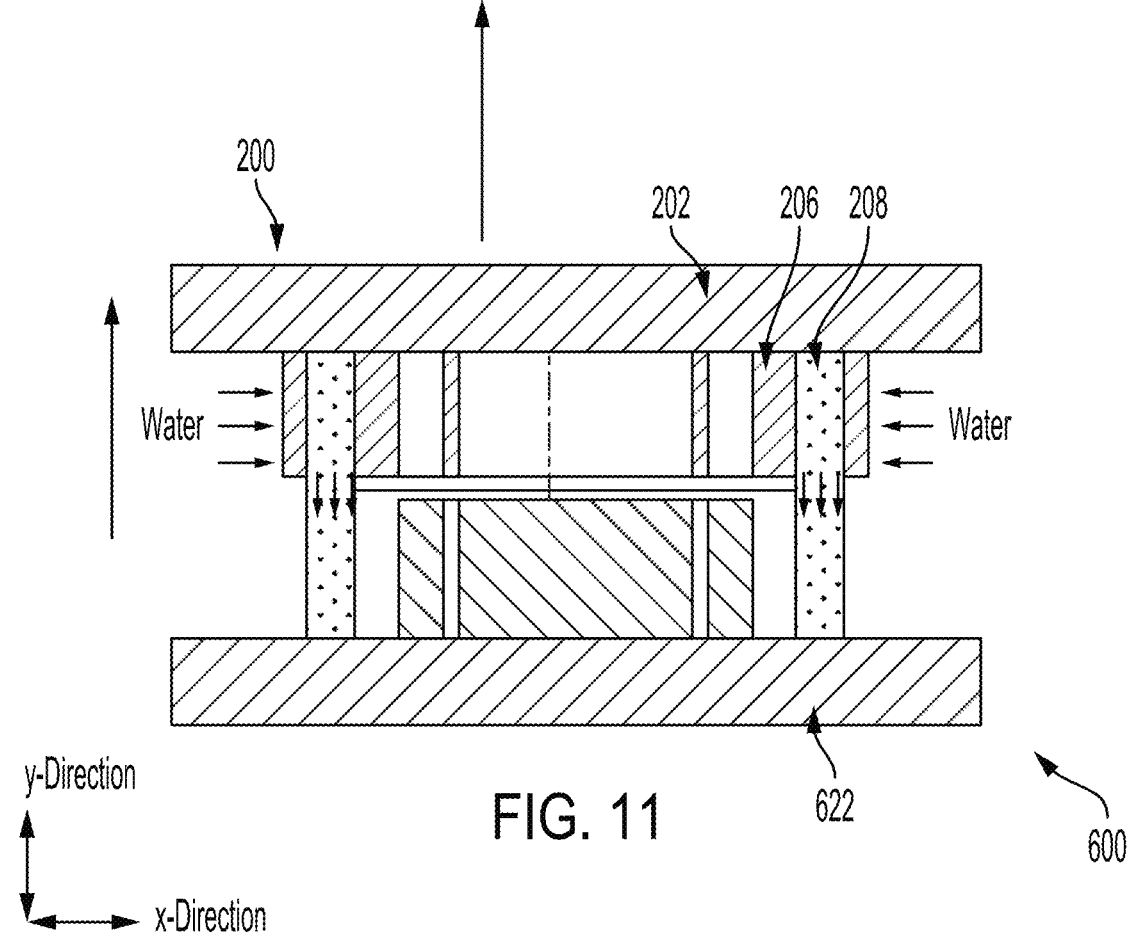
FIG. 11 is a sketch of a cross section taken along the line of B-B of the example connector of FIG. 7 and a sketch of a cross section taken along the line of C-C of the example receptacle of FIG. 7 with the connector and the receptacle auto detached after exposure to moisture.

FIG. 8 illustrates the connector 200 as it is being connected to the receptacle 600, as indicated by the arrow. FIG. 9 illustrates the connector 200 and the receptacle 600 in an assembled state. The connector 200 is fully seated on the receptacle 600. As noted above, this type of assembled connection may be used internally in various electronic devices FIGS. 10 and 11 illustrate the sequence of events when water or moisture penetrates the connector 200. For example, as discussed above, the electronic device where this connection is being used may get wet and water (or another liquid) may seep or leak inside the electronic device. When water reaches the connector 200, the water is able to penetrate the outer layer 206 of the connector 200 because the outer layer 206 includes a permeable structure and/or a permeable material(s).

As discussed above, the multi-layer peripheral structure 205 is structured to allow the water or moisture to permeate through the outer layer 206 and penetrate the middle layer 208. The multi-layer peripheral structure 205 is structured not to let the water or moisture penetrate through the inner layer 210 to the pins 204. At a minimum, the multi-layer peripheral structure 205 is structured to delay the water or moisture from penetrating through the inner layer 210 to the pins 204.

When the water or moisture contacts the middle layer 208, the middle layer 208 includes material that is configured to absorb the water or moisture and to expand in a vertical direction (Y-direction) and not in a horizontal direction (X-direction), as shown by the arrows in FIGS. 10 and 11. The middle layer 208 is constrained from expanding in the X-direction because it is contained by the inner layer 210 and the outer layer 206. That is, the middle layer 208 is sandwiched between the inner layer 210 and the outer layer 206. When the amount of absorption in the material of the middle layer 208 reaches a certain level, the middle layer 208 expands in the vertical direction (Y-direction) and forces itself off of the receptacle 600, as shown in FIG. 11. That is, the middle layer 208 increases in height in the Y-direction to push away from the receptacle 600, in response to the absorption of water in the middle layer 208. In this manner, the connector 200 is no longer connected to the receptacle 600 and further damage to the electronic device may be prevented.

In some implementations, the receptacle 600 may include a multi-layer peripheral structure similar to the multi-layer peripheral structure 205 of the connector 200. In this manner, such a receptacle may be configured to detach from the connector 200 without user intervention when exposed to water.

Figure 12:
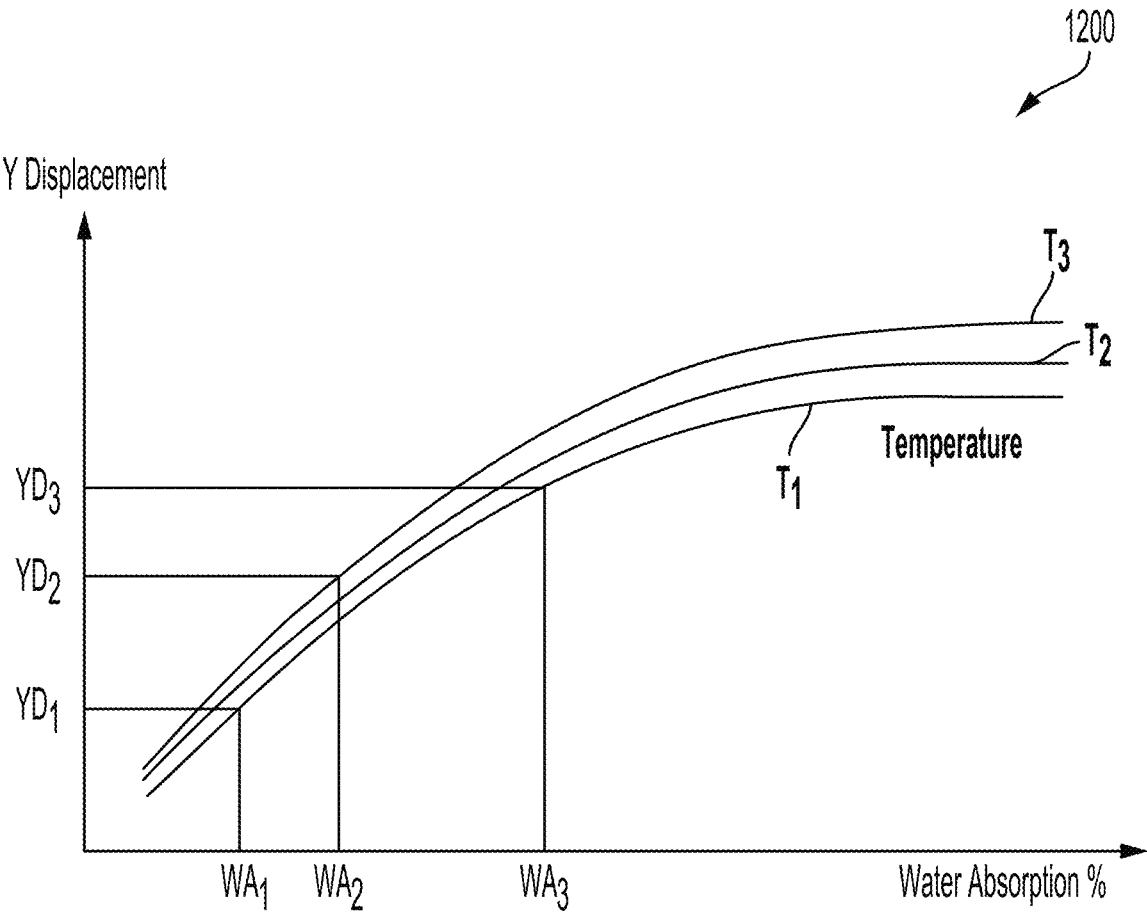
FIG. 12 is an example graph of Y displacement of the connector of FIG. 2 as a function of water absorption of the middle layer of the connector.

Referring to FIG. 12, a graph 1200 illustrates the Y displacement of the middle layer 108 or 208 as a function of the water absorption rate of the middle layer 108 or 208 in terms of the temperature and coefficient of the moisture expansion curves and the face surface area and volume of the middle layer 108 and 208. The chart 1200 illustrates the change in height of the middle layer 108 and 208 as Y displacement (YD). In the normal operation range between YD1 and YD2, the connector 100 or 200 operates normally, for example, with power supplied. In the operation range between YD2 and YD3, the power may be cut and the connector 100 or 200 is still attached, for example, being held on to the receptacle by friction. This may allow recovery when the middle layer 108 or 208 water absorption rate goes down. The absorption of water by the middle layer 108 or 208 and the sealing structure of the inner layer 110 or 210 may provide protection to the metal connection pins from moisture.

In the operation range at and/or above YD3, the connector 100 or 200 auto detaches from the receptacle by the displacement forces caused by the absorption of water and increase in height of the middle layer 108 or 208. The chart 1200 illustrates the cross-over points for YD1, YD2, and YD3, based on a combination of the water absorption percentage of the middle layer 108 or 208 (WA1, WA2, and WA3) and the temperature coefficients T1, T2, and T3.

Figure 13:
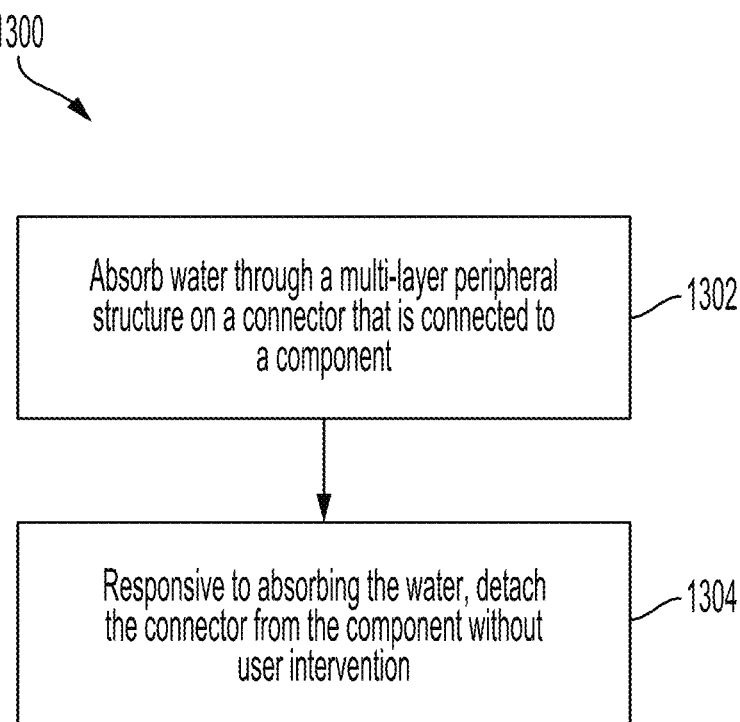
FIG. 13 is a flow chart of an example process of auto detaching the connector of FIG. 2 in response to moisture exposure.

Referring to FIG. 13, an example process 1300 illustrates the operation of the connector 100 of FIG. 1 or the connector 200 of FIG. 2. Process 1300 describes a method for auto-detaching a connector from a component. Process 1300 includes absorbing water through a multi-layer peripheral structure on a connector that is connected to a component (1302) and responsive to absorbing the water, detaching the connector from the component without user intervention (1304).

For example, the connector 200 may absorb water through the multi-layer peripheral structure 205 and the connector 200 may be connected to a receptacle 600. In response to absorbing the water, the connector 200 may detach from the receptacle 600 without user intervention. As discussed in detail above, when water penetrates the outer layer 206, the middle layer 208 may absorb the water and expand. The expansion of the middle layer 208 in the Y-direction (vertical direction) separates or detaches the connector 200 from the receptacle 600 without user intervention.

Figure 14:
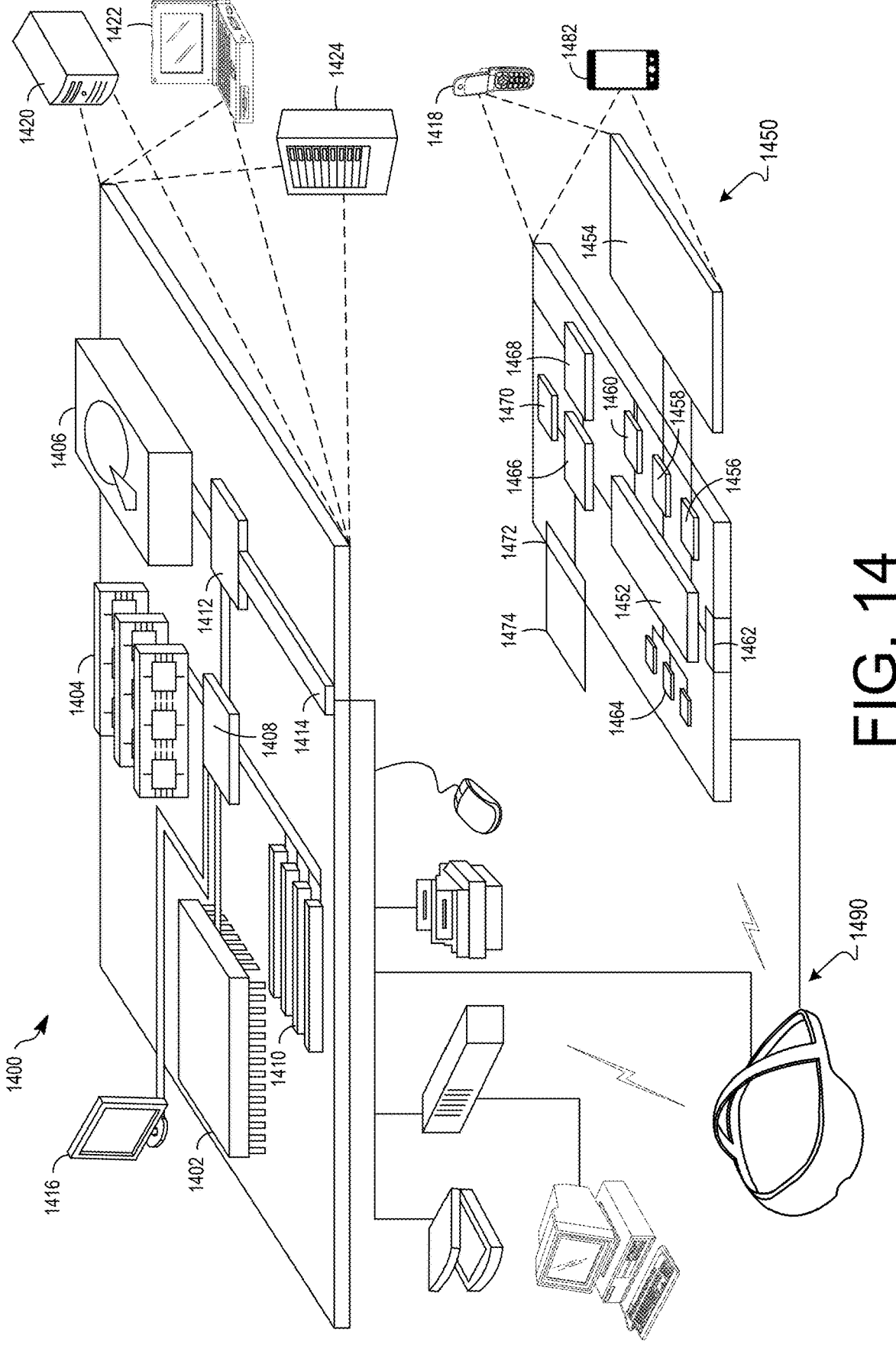
FIG. 14 shows an example of a computer device and a mobile computer device that may include the example connector of FIG. 1 and/or the example connector of FIG. 2.

FIG. 14 shows an example of a computer device and a mobile computer device that may include the connector 100 of FIG. 1 and/or the connector 200 of FIG. 2 described here. FIG. 14 shows an example of a generic computer device 1400 and a generic mobile computer device 1450, which may be used with the connectors described here. Computing device 1400 is intended to represent various forms of digital computers, such as laptops, desktops, tablets, workstations, personal digital assistants, televisions, servers, blade servers, mainframes, and other appropriate computing devices. Computing device 1450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. The processor 1402 can be a semiconductor-based processor. The memory 1404 can be a semiconductor-based memory. Each of the components 1402, 1404, 1406, 1408, 1410, and 1412, are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple buses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a volatile memory unit or units. In another implementation, the memory 1404 is a non-volatile memory unit or units. The memory 1404 may also be another form of computer-readable medium, such as a magnetic or optical disk.

The storage device 1406 is capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1404, the storage device 1406, or memory on processor 1402.

The high speed controller 1408 manages bandwidth-intensive operations for the computing device 1400, while the low speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed expansion port 1414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a microdrive or other device, to provide additional storage. Each of the components 1450, 1452, 1464, 1454, 1466, and 1468, are interconnected using various buses, and several of the components may be mounted on a common motherboard or in other manners as appropriate, including using the connector 100 and/or the connector 200 described herein.

The processor 1452 can execute instructions within the computing device 1450, including instructions stored in the memory 1464. The processor may be implemented as a chipset of chips that include separate and multiple analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD (Thin-Film-Transistor Liquid Crystal Display) or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provide in communication with processor 1452, so as to enable near area communication of device 1450 with other devices.

External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1474 may also be provided and connected to device 1450 through expansion interface 1472, which may include, for example, a SIMM (Single In Line Memory Module) card interface. Such expansion memory 1474 may provide extra storage space for device 1450, or may also store applications or other information for device 1450. Specifically, expansion memory 1474 may include instructions to carry out or supplement the processes described above, and may include secure information also. Thus, for example, expansion memory 1474 may be provide as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1474, or memory on processor 1452, that may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, WiFi, or other such transceiver (not shown). In addition, GPS (Global Positioning System) receiver module 1470 may provide additional navigation- and location-related wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

The computing device 1450 may be implemented in a number of different forms, as shown in the figure. For example, it may be implemented as a cellular telephone 1418. It may also be implemented as part of a smart phone 1482, personal digital assistant, or other similar mobile device.

In some implementations, the computing devices depicted in FIG. 14 can include sensors that interface with a virtual and/or augmented reality (VR/AR) headset 1490. The VR/AR headset 1490 may include smart eyewear or smart glasses. Smart eyewear are glasses (or smart glasses) that add information alongside what the wearer sees through the glasses. Superimposing information (e.g., digital images) onto a field of view may be achieved through smart optics such as an optical head-mounted display (OHMD), or embedded wireless glasses with a transparent heads-up display (HUD), or augmented reality (AR) overlay. Modern smart eyewear are effectively wearable computers which can run self-contained mobile apps. Some may be handsfree and can communicate with the Internet via natural language voice commands, while others may use touch buttons. Smart eyewear typically includes electronic components disposed in the eyewear. For example, electronic components may be additionally disposed in one or both of the temples. The smart glasses and its included electronic components may use connectors such as connector 100 and/or connector 200 described herein.

Furthermore, one or more sensors included on a computing device 1450 or other computing device depicted in FIG. 14, can provide input to VR headset 1490 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 1450 can use the sensors to determine an absolute position and/or a detected rotation of the computing device in the VR space that can then be used as input to the VR space. For example, the computing device 1450 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 1450 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1450 when the computing device is incorporated into the VR space can cause a particular action to occur in the VR space.

In some implementations, a touchscreen of the computing device 1450 can be rendered as a touchpad in VR space. A user can interact with the touchscreen of the computing device 1450. The interactions are rendered, in VR headset 1490 for example, as movements on the rendered touchpad in the VR space. The rendered movements can control objects in the VR space.

In some implementations, one or more output devices included on the computing device 1450 can provide output and/or feedback to a user of the VR headset 1490 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file.

The output devices can include, but are not limited to, vibration motors, vibration coils, piezoelectric devices, electrostatic devices, light emitting diodes (LEDs), strobes, and speakers.

In some implementations, the computing device 1450 may appear as another object in a computer-generated, 3D environment. Interactions by the user with the computing device 1450 (e.g., rotating, shaking, touching a touchscreen, swiping a finger across a touch screen) can be interpreted as interactions with the object in the VR space. In the example of the laser pointer in a VR space, the computing device 1450 appears as a virtual laser pointer in the computer-generated, 3D environment. As the user manipulates the computing device 1450, the user in the VR space sees movement of the laser pointer. The user receives feedback from interactions with the computing device 1450 in the VR space on the computing device 1450 or on the VR headset 1490.

A number of embodiments have been described. Nevertheless, it will be understood that various modifications may be made without departing from the spirit and scope of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

In the following some examples are described.

Example 1: A connector, comprising:
a housing; and
a multi-layer peripheral structure disposed on the housing, the multi-layer peripheral structure configured to enclose one or more pins and to expand in response to exposure to a liquid for disconnecting the connector from an electronic component without user intervention.

Example 2: The connector as in example 1, wherein the multi-layer peripheral structure comprises:
an outer layer;
a middle layer disposed within the outer layer; and
an inner layer disposed within the middle layer.

Example 3: The connector as in example 2, wherein the outer layer includes a permeable structure.

Example 4: The connector as in example 2 or 3, wherein the outer layer includes a permeable material.

Example 5: The connector as in any of the preceding examples, wherein the permeable material includes a mesh material.

Example 6: The connector as in any of the preceding examples, wherein the middle layer includes a material that expands when the material gets wet.

Example 7: The connector as in any of the preceding examples, wherein the middle layer includes a superabsorbent polymer.

Example 8: The connector as in any of the preceding examples, wherein the middle layer includes sodium polyacrylate.

Example 9: The connector as in any of the preceding examples, wherein the middle layer includes HydroSpan.

Example 10: The connector as in any of the preceding examples, wherein the inner layer includes at least one of a solid structure and a non-permeable material.

Example 11: The connector as in any of the preceding examples, wherein a height of the middle layer is greater than a height of the inner layer and a height of the outer layer.

Example 12: The connector as in any of the preceding examples, wherein the middle layer is constrained from expanding in a horizontal direction by the inner layer and the outer layer.

Example 13: The connector as in any of the preceding examples, wherein the middle layer is configured to expand in a vertical direction and not in a horizontal direction, the vertical direction being essentially parallel to in an extension plane of the middle layer and the horizontal plane being essentially perpendicular to the extension plane of the middle layer.

Example 14: An electronic device, comprising:
a printed circuit board (PCB) having one or more components;
a battery; and
a connector to connect the battery to the PCB, wherein the connector includes:
a housing, and
a multi-layer peripheral structure disposed on the housing, the multi-layer peripheral structure configured to enclose one or more pins and to expand in response to exposure to a liquid for disconnecting the connector from the PCB without user intervention.

Example 15: The electronic device as in example 14, wherein the multi-layer peripheral structure comprises:
an outer layer;
a middle layer disposed within the outer layer; and
an inner layer disposed within the middle layer.

Example 16: The electronic device as in any of the preceding examples, wherein the outer layer includes a permeable structure.

Example 17: The electronic device as in any of the preceding examples, wherein the outer layer includes a permeable material.

Example 18: The electronic device as in any of the preceding examples, wherein the permeable material includes a mesh material.

Example 19: The electronic device as in any of the preceding examples, wherein the middle layer includes a material that expands when the material gets wet.

Example 20: The electronic device as in any of the preceding examples, wherein the middle layer includes a superabsorbent polymer.

Example 21: The electronic device as in any of the preceding examples, wherein the middle layer includes sodium polyacrylate.

Example 22: The electronic device as in any of the preceding examples, wherein the middle layer includes HydroSpan.

Example 23: The electronic device as in any of the preceding examples, wherein the inner layer includes at least one of a solid structure and a non-permeable material.

Example 24: The electronic device as in any of the preceding examples, wherein a height of the middle layer is greater than a height of the inner layer and a height of the outer layer.

Example 25: The electronic device as in any of the preceding examples, wherein the middle layer is constrained from expanding in a horizontal direction by the inner layer and the outer layer.

Example 26: The electronic device as in any of the preceding examples, wherein the middle layer is configured to expand in a vertical direction and not in a horizontal direction, the vertical direction being essentially parallel to in an extension plane of the middle layer and the horizontal direction being essentially perpendicular to the extension plane of the middle layer.

Example 27: A method for auto-detaching a connector from a component, the connector comprising a multi-layer peripheral structure configured to enclose one or more pins and to expand in response to exposure to a liquid for disconnecting the connector from an electronic component, the method comprising:

absorbing water through the multi-layer peripheral structure of the connector that is connected to a component; and responsive to absorbing the water, detaching the connector from the component without user intervention by expansion of the multi-layer peripheral structure.

Example 28: The method as in example 27, wherein the multi-layer peripheral structure comprises:

an outer layer;

a middle layer disposed within the outer layer; and an inner layer disposed within the middle layer.

Example 29: The method as in any of the preceding examples, wherein the outer layer includes a permeable structure.

Example 30: The method as in any of the preceding examples, wherein the outer layer includes a permeable material.

Example 31: The electronic device as in any of the preceding examples, wherein the permeable material includes a mesh material.

Example 32: The method as in any of the preceding examples, wherein the middle layer includes a material that expands when the material gets wet.

Example 33: The method as in any of the preceding examples, wherein the middle layer includes a superabsorbent polymer.

Example 34: The method as in any of the preceding examples, wherein the middle layer includes sodium polyacrylate.

Example 35: The method as in any of the preceding examples, wherein the middle layer includes HydroSpan.

Example 36: The method as in any of the preceding examples, wherein the inner layer includes at least one of a solid structure and a non-permeable material.

Example 37: The method as in any of the preceding examples, wherein a height of the middle layer is greater than a height of the inner layer and a height of the outer layer.

Example 38: The method as in any of the preceding examples, wherein the middle layer is constrained from expanding in a horizontal direction by the inner layer and the outer layer.

Example 39: The method as in any of the preceding examples, wherein the middle layer is configured to expand in a vertical direction and not in a horizontal direction, the vertical direction being essentially parallel to in an extension plane of the middle layer and the horizontal direction being essentially perpendicular to the extension plane of the middle layer.

Example 40: A connector, comprising:

a housing; and a multi-layer peripheral structure disposed on the housing, the multi-layer peripheral structure configured to enclose one or more pins and to expand in response to exposure to a liquid.

Example 41: The connector as in example 40, wherein the multi-layer peripheral structure comprises:

an outer layer;

a middle layer disposed within the outer layer; and an inner layer disposed within the middle layer.

Example 42: The connector as in example 41, wherein the outer layer includes a permeable structure.

Example 43: The connector as in example 41 or 42, wherein the outer layer includes a permeable material.

Example 44: The connector as in any of the preceding examples, wherein the permeable material includes a mesh material.

Example 45: The connector as in any of the preceding examples, wherein the middle layer includes a material that expands when the material gets wet.

Example 46: The connector as in any of the preceding examples, wherein the middle layer includes a superabsorbent polymer.

Example 47: The connector as in any of the preceding examples, wherein the middle layer includes sodium polyacrylate.

Example 48: The connector as in any of the preceding examples, wherein the middle layer includes HydroSpan.

Example 49: The connector as in any of the preceding examples, wherein the inner layer includes at least one of a solid structure or a non-permeable material.

Example 50: The connector as in any of the preceding examples, wherein a height of the middle layer is greater than a height of the inner layer and a height of the outer layer.

Example 51: The connector as in any of the preceding examples, wherein the middle layer is constrained from expanding in a horizontal direction by the inner layer and the outer layer.

Example 52: The connector as in any of the preceding examples, wherein the middle layer is configured to expand in a vertical direction and not in a horizontal direction, the vertical direction being essentially parallel to in an extension plane of the middle layer and the horizontal direction being essentially perpendicular to the extension plane of the middle layer.

Example 53: An electronic device, comprising:

a printed circuit board (PCB) having one or more components;

a battery; and a connector to connect the battery to the PCB, wherein the connector includes:

a housing, and a multi-layer peripheral structure disposed on the housing, the multi-layer peripheral structure configured to enclose one or more pins and to expand and disconnect from the PCB in response to exposure to a liquid.

Example 54: The electronic device as in example 53, wherein the multi-layer peripheral structure comprises:

an outer layer;

a middle layer disposed within the outer layer; and an inner layer disposed within the middle layer.

Example 55: The electronic device as in any of the preceding examples, wherein the outer layer includes a permeable structure.

Example 56: The electronic device as in any of the preceding examples, wherein the outer layer includes a permeable material.

Example 57: The electronic device as in any of the preceding examples, wherein the permeable material includes a mesh material.

Example 58: The electronic device as in any of the preceding examples, wherein the middle layer includes a material that expands when the material gets wet.

Example 59: The electronic device as in any of the preceding examples, wherein the middle layer includes a superabsorbent polymer.

Example 60: The electronic device as in any of the preceding examples, wherein the middle layer includes sodium polyacrylate.

Example 61: The electronic device as in any of the preceding examples, wherein the middle layer includes HydroSpan.

Example 62: The electronic device as in any of the preceding examples, wherein the inner layer includes at least one of a solid structure or a non-permeable material.

Example 63: The electronic device as in any of the preceding examples, wherein a height of the middle layer is greater than a height of the inner layer and a height of the outer layer.

Example 64: The electronic device as in any of the preceding examples, wherein the middle layer is constrained from expanding in a horizontal direction by the inner layer and the outer layer.

Example 65: The electronic device as in any of the preceding examples, wherein the middle layer is configured to expand in a vertical direction and not in a horizontal direction, the vertical direction being essentially parallel to in an extension plane of the middle layer and the horizontal direction being essentially perpendicular to the extension plane of the middle layer.

Example 66: A method for auto-detaching a connector from a component, the method comprising:

absorbing water through a multi-layer peripheral structure on a connector that is connected to a component; and responsive to absorbing the water, detaching the connector from the component without user intervention by expansion of the multi-layer peripheral structure.

Example 67: The method as in example 66, wherein the multi-layer peripheral structure comprises:

an outer layer;

a middle layer disposed within the outer layer; and an inner layer disposed within the middle layer.

Example 68: The method as in any of the preceding examples, wherein the outer layer includes a permeable structure.

Example 69: The method as in any of the preceding examples, wherein the outer layer includes a permeable material.

Example 70: The electronic device as in any of the preceding examples, wherein the permeable material includes a mesh material.

Example 71: The method as in any of the preceding examples, wherein the middle layer includes a material that expands when the material gets wet.

Example 72: The method as in any of the preceding examples, wherein the middle layer includes a superabsorbent polymer.

Example 73: The method as in any of the preceding examples, wherein the middle layer includes sodium polyacrylate.

Example 74: The method as in any of the preceding examples, wherein the middle layer includes HydroSpan.

Example 75: The method as in any of the preceding examples, wherein the inner layer includes at least one of a solid structure or a non-permeable material.

Example 76: The method as in any of the preceding examples, wherein a height of the middle layer is greater than a height of the inner layer and a height of the outer layer.

Example 77: The method as in any of the preceding examples, wherein the middle layer is constrained from expanding in a horizontal direction by the inner layer and the outer layer.

Example 78: The method as in any of the preceding examples, wherein the middle layer is configured to expand in a vertical direction and not in a horizontal direction, the vertical direction being essentially parallel to in an extension plane of the middle layer and the horizontal direction being essentially perpendicular to the extension plane of the middle layer.

What is claimed is:

1. A connector, comprising:

a housing; and a multi-layer peripheral structure disposed on the housing, the multi-layer peripheral structure configured to enclose one or more pins associated with an electronic component and to expand in response to exposure to a liquid for physically disconnecting the connector from the electronic component without user intervention.

2. The connector of claim 1, wherein the multi-layer peripheral structure comprises:

an outer layer;

a middle layer disposed within the outer layer; and an inner layer disposed within the middle layer.

3. The connector of claim 2, wherein the outer layer includes a permeable structure.

4. The connector of claim 2, wherein the outer layer includes a permeable material.

5. The connector of claim 4, wherein the permeable material includes a mesh material.

6. The connector of claim 2, wherein the middle layer includes a material that expands when the material gets wet.

7. The connector of claim 2, wherein the middle layer includes a superabsorbent polymer.

8. The connector of claim 2, wherein the middle layer includes sodium polyacrylate.

9. The connector of claim 2, wherein the inner layer includes at least one of a solid structure and a non-permeable material.

10. The connector of claim 2, wherein a height of the middle layer is greater than a height of the inner layer and a height of the outer layer.

11. The connector of claim 2, wherein the middle layer is constrained from expanding in a horizontal direction by the inner layer and the outer layer.

12. The connector of claim 2, wherein the middle layer is configured to expand in a vertical direction and not in a horizontal direction, the vertical direction being essentially parallel to an extension plane of the middle layer and the horizontal direction being essentially perpendicular to the extension plane of the middle layer.

13. An electronic device, comprising:

a printed circuit board (PCB) having one or more components;

a battery; and a connector to connect the battery to the PCB, wherein the connector includes:

a housing, and a multi-layer peripheral structure disposed on the housing, the multi-layer peripheral structure configured to enclose one or more pins associated with the PCB and to expand in response to exposure to a liquid for physically disconnecting the connector from the PCB without user intervention.

14. The electronic device of claim 13, wherein the multi-layer peripheral structure comprises:

an outer layer;

a middle layer disposed within the outer layer; and an inner layer disposed within the middle layer.

15. The electronic device of claim 14, wherein the outer layer includes a permeable material.

16. The electronic device of claim 14, wherein the middle layer includes a superabsorbent polymer.

17. The electronic device of claim 14, wherein the middle layer includes sodium polyacrylate.

18. A method for auto-detaching a connector from a component, the connector comprising a multi-layer peripheral structure configured to enclose one or more pins and to expand in response to a liquid for disconnecting the connector from an electronic component, the method comprising:

absorbing water through the multi-layer peripheral structure of the connector that is connected to the electronic component; and responsive to absorbing the water, physically detaching the connector from the electronic component without user intervention by expansion of the multi-layer peripheral structure.

19. The method as in claim 18, wherein the multi-layer peripheral structure comprises:

an outer layer that includes a permeable material;

a middle layer disposed within the outer layer, wherein the middle layer includes an absorbent material; and an inner layer disposed within the middle layer.

\* \* \* \* \*